July 15, 1952     J. A. H. SARGEAUNT     2,603,422
TEMPERATURE CONTROL SYSTEM
Filed Nov. 30, 1948
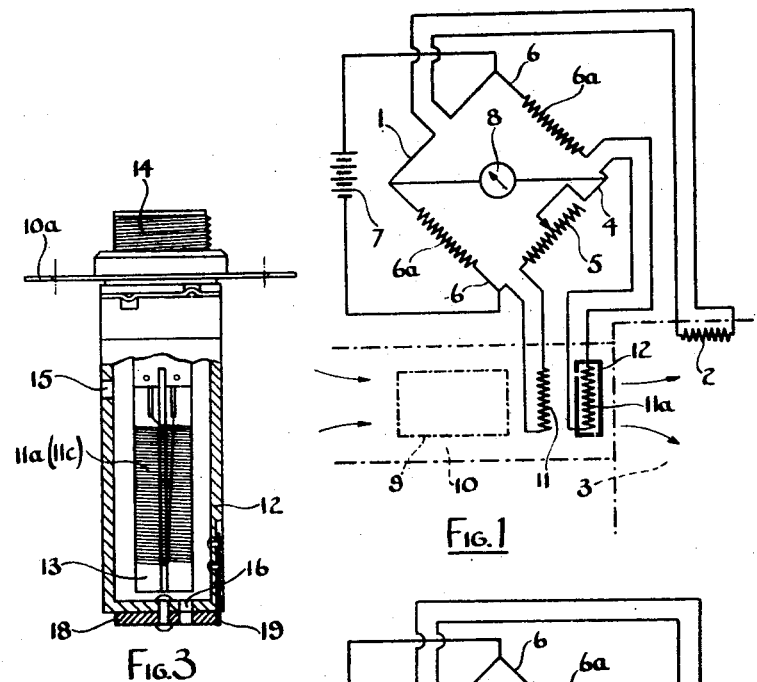
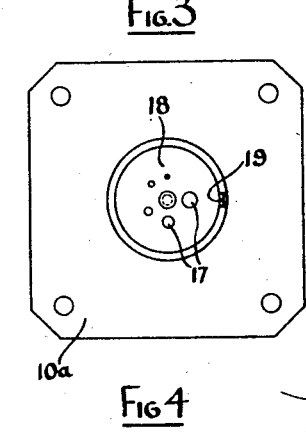
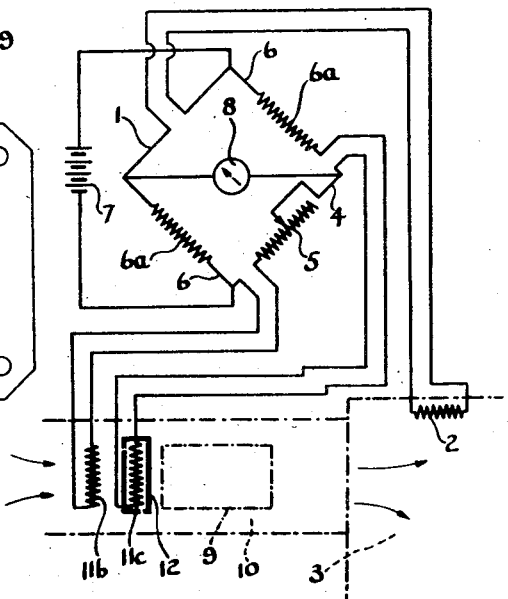
Inventor
James Antony Hosking Sargeaunt
By
Beaman & Batch
Attorneys Patented July 15, 1952

2,603,422

UNITED STATES PATENT OFFICE 2,603,422

TEMPERATURE CONTROL SYSTEM

James Antony Hosking Sargeaunt, Cefn Coed, near Merthyr Tydfil, South Wales

Application November 30, 1948, Serial No. 62,665
In Great Britain December 3, 1947

3 Claims. (Cl. 236—91)

This invention relates to temperature control systems of the kind embodying a temperature sensitive resistance as the control element, said resistance being connected into one arm of a Wheatstone bridge circuit of which the opposite arm includes a non-temperature sensitive resistance whereby variation of temperature at the control point will modify the balance of the bridge, the resultant flow or change of flow of current across the bridge being utilized, after amplification, to regulate the operation of heating and/or cooling means for the purpose of restoring the temperature at the control point to the desired value.

Control systems of the above kind have found particular application in the air conditioning of aircraft but the present invention is not limited in this respect and has application in other fields where control of temperature is effected by the flow or circulation of a heated or cooled fluid to the space or zone under temperature control, and with particular advantage where there are considerable fluctuations in the ambient air temperature.

Where, in a temperature control system of the above kind, the conditioning air or other fluid has to travel a substantial distance from the heater or cooler unit to the zone under temperature control, as for example in air conditioning systems for aircraft cabins, the resultant time lag thus introduced between the response of said unit and the effect being sensed at the control point causes the system to over-run and "hunt." To cure this defect, mechanical or electrical feed-back or follow-up devices have been proposed to effect a temporary limitation of the change of temperature of the conditioning air or other fluid but such systems result in conditions of balance being established in the Wheatstone bridge circuit with a varying temperature at the control point and prevention of over-run is only achieved by sacrificing control at one fixed temperature and keeping the control temperature within a predetermined band. Alternatively, difficulty is often experienced in providing a mechanical follow-up by virtue of the disposition of the various components.

Again, where the ambient air temperature varies quickly and widely, as on an aircraft, to await the ultimate effect of a change of such temperature upon the control element might result in wide fluctuation in the temperature at the control point and, in the case of an aircraft cabin, discomfort to the passengers. To avoid such wide temperature changes the provision of an anticipatory control has been considered in the form of a temperature sensitive resistance exposed to the ambient air and connected into the Wheatstone bridge circuit in such manner as to unbalance the circuit upon a change of ambient air temperature and so initiate additional heating or cooling in anticipation of a demand by the main control element. With this arrangement however, the desired control temperature can only be maintained at one particular ambient air temperature as variation of the anticipatory resistance above or below the setting temperature when the circuit is initially balanced results in a re-balance of the circuit with the temperature at the control point below or above the desired value, that is, the control temperature moves up or down in inverse ratio to that of the ambient air temperature although to a lesser degree dependent upon the proportionate values of the anticipatory resistance and the main control resistance.

The object of the present invention is to provide improvements in control systems of the kind referred to which overcome the disadvantages above mentioned in a simple but effective manner and enable the temperature at the control point to be maintained at one fixed point irrespective of varying ambient air temperature and with avoidance of over-run and "hunting."

According to the invention the control system includes a pair of supplementary, temperature sensitive resistances of like value which are connected respectively into adjacent sides of the Wheatstone Bridge circuit such that they do not normally influence the balance thereof and one of which is directly exposed to the surrounding temperature whilst the other is thermally shrouded so as to respond to a change in said temperature only after a predetermined time lag, said resistances being so disposed in relation to the ambient air or to the fluid stream of the heating or cooling system as to govern the degree and frequency of temperature change at the zone or space under control.

With use of the supplementary resistances as an anticipatory control, rapid change of ambient air temperature will be sensed immediately by the unshrouded resistance and the bridge circuit thus unbalanced to create a demand for varied heating or cooling, but after a predetermined time interval the shrouded resistance will react to the said temperature change and will cancel out the effect of the unshrouded resistance on the system leaving the latter under control of the main control element and without disturbing the true temperature control point of the system.

By mounting the supplementary resistances in the heating or cooling fluid stream between the space or zone under temperature control and the heating or cooling unit, any variation in output of said unit in response to a demand at the control point, or by the anticipatory control where provided, will be sensed by the unshrouded resistance before it is sensed at the control point and, as soon as the change of temperature of the conditioning fluid reaches a predetermined value, said resistance will re-balance the bridge circuit and stop any further change of fluid temperature. After a predetermined time lag the associated shrouded resistance will react to the temperature change and will cancel out the effect of the unshrouded resistance on the bridge circuit and control will once again revert to the main control element or to the anticipatory device.

For a fuller understanding of the invention reference will now be made to the accompanying drawings wherein:

Fig. 1 is a circuit diagram showing the application of the invention to the control of an air conditioning system for an aircraft cabin, the supplementary resistances being employed to limit the rate of change of temperature of the conditioning air admitted to the aircraft cabin.

Fig. 2 is a diagram similar to Fig. 1 but showing use of the supplementary resistances as an anticipatory control.

Fig. 3 is a part sectional view showing one form of shrouded resistance and

Fig. 4 is an inverted plan of Fig. 3.

Referring first to Fig. 1, it will be seen that a basic Wheatstone bridge circuit is employed, in one arm 1 of which is inserted a temperature sensitive resistance 2, for example of nickel, said resistance being mounted in the cabin 3 and constituting the main control element. The opposite arm 4 of the bridge includes a non-temperature sensitive resistance 5, for example of Manganin, whilst the other opposed pair of bridge arms 6 each include a fixed non-temperature sensitive resistance 6a. The bridge is connected to a source 7 of electric current in the usual manner so that when the bridge is unbalanced there is a flow of current across the bridge. For the purpose of illustration there is shown a galvanometer 8 to indicate such current flow but in practice this flow of current is utilized after amplification to control the output of a heater 9 arranged in a duct 10 through which conditioning air is supplied to the cabin 3. It must be understood that whilst the heater has been shown relatively close to the cabin for convenience, in practice, and particularly on aircraft, constructional requirements often necessitate the placing of the heater at a substantial distance from the cabin.

With the arrangement so far described it will be seen that when the product of the resistances 2 and 5 equals the product of the two resistances 6a the bridge is balanced and the output of the heater 9 remains constant, whilst a change of cabin temperature will alter the value of resistance 2 so unbalancing the bridge and causing an increase or decrease of heater output until the temperature at the control point is restored to the desired level. The resistance 5 is variable in order that the temperature in the cabin may be controlled at a desired level.

To limit the rate of change of temperature in the cabin a pair of supplementary temperature sensitive resistances 11, 11a are located in the duct 10 between the heater and the cabin, the resistance 11 being connected into bridge arm 4 and resistance 11a into one of the bridge arms 6. Resistance 11 is directly exposed to the air stream in the duct 10 whilst resistance 11a is enclosed in a heat insulating shroud 12 within which a gradual change of air may take place whereby said resistance will only react to a change of temperature of the air stream after a predetermined time lag. Thus when the control resistance 2 has created a demand for a change of heater output, such change will be sensed by the unshrouded resistance 11 before it is sensed by cabin resistance 2 and as soon as resistance 11 reaches a predetermined value it will rebalance the bridge circuit and check any further change in heat output. Subsequently the resistance 11a will react to the temperature change in the conditioning air and will cancel out the effect of the resistance 11 on the bridge circuit whereby control is again restored to the cabin element 2.

The relative values of the supplementary resistances and of the control resistance 2 may vary according to requirements. Thus, for example, if the resistances 11, 11a each have a value one fifth of that of the resistance 2, then assuming that the control system has a differential of 2° F., that is, the cabin control element will initiate a change of heater output upon a rise or fall of 1° F. from the control temperature, then the temporary re-balance of the system will be effected by a fall or rise of approximately 5° F. of the unshrouded resistance 11. Moreover, should the control temperature rise or fall 2° F. then a rise or fall of 10° F. will be required at the resistance 11 temporarily to rebalance the circuit so that the degree of change of heater output is proportional to the demand created at the control point. It will be seen, therefore, that by the means described the change of temperature at the cabin air inlet is definitely limited both in amount and frequency, these factors being governed respectively by the proportionate values of the supplementary resistances and of the cabin control resistance and by the time lag in the operation of the shrouded supplementary resistance.

The arrangement shown in Fig. 2 employs the same basic bridge circuit but the supplementary temperature sensitive resistances 11b, 11c, which in this instance operate as an anticipatory device, are located in the duct 10 in advance of the heater or they may be mounted at any external point on the aircraft. Thus the resistance 11b will react to a rapid change of ambient air temperature before the control resistance 2, unbalancing the bridge circuit and increasing or decreasing the heater output in anticipation of a demand at the control point. After a predetermined time interval resistance 11c reacts to the ambient temperature change, cancels out the effect of resistance 11b on the bridge circuit and so restores control to the cabin element, whereby the system is enabled to operate at the true control point.

It will be appreciated that there is an optimum setting point when the bridge has arms of equal value, and that adjustment of the variable resistance 5 away from this optimum point will result in the bridge differing from the ideal form. By suitable choice of the resistance values, however, such digression from the true control point can be kept so small as to be of little or no account and for practical purposes may be considered negligible.

Figs. 3 and 4 show one constructional embodiment of the shrouded resistance 11a or 11c. The resistance is wound on a former 13 of cruciform cross section which is supported from a socket member 14 to facilitate easy connection into the control circuit, said socket member being attached in any suitable manner as for example by a plate 10a to the wall of the duct. The resistance is enclosed by the heat insulating shroud 12 which has a port 15 in its side wall and a further port 16 in its base wall so that when located in the air stream in the duct 10, or the air stream external of the aircraft, only a gradual change of air within the shroud and around the resistance is permitted. The size of the ports is calculated in accordance with the time lag required in the reaction of the resistance and in order to vary the time lag at least one of the ports is adjustable in size. As shown, the port 16 co-operates with a series of graduated holes 17 formed in a disc 18 rotatably mounted on the base of the shroud. A spring finger 19 engages the periphery of the disc to retain it in a set position.

It is to be understood that the arrangements of the supplementary resistances according to Figs. 1 and 2 operate independently of one another and both pairs may be used in one circuit or either pair may be used without the other. Moreover, resistances 11 and 11b may equally be connected into arm 1 of the bridge instead of into arm 4, or one of said resistances may be connected into arm 1 and the other into arm 4, according to operational requirements, the resistances 11a and 11c being connected into either of arms 6. Again, whilst a single cabin control element or resistance has been described, a number of resistances located at different points in the cabin or other enclosure may be employed so that the system operates according to a mean control temperature over a plurality of cabin zones.

The improved control means according to the present invention is applicable to all systems where the heat input or cooling action is capable of regulated variation.

In the air conditioning of aircraft cabins the system may be adapted to operate such components as valves and shutters of intercooler units associated with cabin blowers, variable output combustion heaters, valves or shutters of variable output heat extinguisher systems and control valves or shutters of cold air units together with any combinations of these or similar apparatus which may be evolved and which are capable of variable control.

I claim:

1. In a temperature control apparatus, with a compartment having an air supply duct leading thereto, heating means in said duct heating air passing therethrough, a Wheatstone bridge circuit having a temperature sensitive resistance located within the compartment connected with one arm of the bridge circuit and a non-temperature responsive resistance connected in the opposite arm of the bridge circuit, a pair of supplementary temperature sensitive resistances of substantially like values located in the duct beyond the heating means and adjacent to the discharge from the duct, one said supplementary resistance being directly exposed to the surrounding temperature within the duct and the other said supplementary resistance being shrouded so as to respond to temperature changes within the duct only after a predetermined time lag and said supplementary resistances being disposed in close relationship within the duct so as to be responsive to the same surrounding thermal conditions, and means in the Wheatstone bridge circuit affected by changes in the condition of said circuit.

2. In a temperature control apparatus for a compartment having an air duct leading thereto for supply of controlled air, heating means in said air duct located in advance of the discharge opening thereof into the compartment, a Wheatstone bridge circuit having a temperature sensitive resistance located within the compartment connected with one arm of the bridge circuit and a non-temperature responsive resistance connected in the opposite arm of the bridge circuit, a pair of supplementary temperature sensitive resistances of substantially like values located in proximity in the duct between the heating means and the discharge opening of the duct and connected respectively with opposite sides of the Wheatstone bridge circuit so that said supplementary resistances are exposed to substantially the same surrounding temperature, one of said supplementary resistances being directly exposed to air passing through said duct to the compartment, and a covering on the other of said supplementary temperature sensitive resistances thermally shrouding said resistance so that such shrouded resistance will react to temperature of the air within the duct only after a predetermined interval of time, and said supplementary resistances being included in the circuit in such connection that when the shrouded supplementary resistance reacts it will cancel out the effect of the unshrouded supplementary resistance in the circuit.

3. The invention as defined in claim 2, in which the shroud for the shrouded supplementary resistance has inlet and outlet ports limiting air circulation therethrough and permitting a gradual change of fluid within said shroud, and variable shutter means having a plurality of openings of graduated sizes adjustably mounted adjacent to at least one of the said ports and adjustable to vary the size of the adjacent port to thus vary the time lag of the shrouded resistance.

JAMES ANTONY HOSKING SARGEAUNT.

REFERENCES CITED

The following references are of record in the file of this patent:

UNITED STATES PATENTS

| Number | Name | Date |
| --- | --- | --- |
| Re. 21,533 | Stoekle et al. | Aug. 13, 1940 |
| 353,179 | Thomson | Nov. 23, 1886 |
| 1,775,682 | Martin | Sept. 16, 1930 |
| 1,946,155 | Foster | Feb. 6, 1934 |
| 2,043,834 | Marbury | June 9, 1936 |
| 2,136,559 | Miller | Nov. 15, 1938 |
| 2,236,624 | Littwin | Apr. 1, 1941 |
| 2,261,343 | De Florez et al. | Nov. 4, 1941 |
| 2,420,043 | Johnson | May 6, 1947 |